United States Patent [19]

Bouchard

[11] Patent Number: 4,532,886
[45] Date of Patent: Aug. 6, 1985

[54] PORTABLE PAINTING ASSEMBLY

[76] Inventor: Roland D. Bouchard, 15419 Doty Ave., Lawndale, Calif. 90260

[21] Appl. No.: 641,066

[22] Filed: Aug. 15, 1984

[51] Int. Cl.³ .................... B05B 1/28; B05B 15/04
[52] U.S. Cl. .................... 118/326; 118/DIG. 7; 98/115.2; 55/DIG. 46
[58] Field of Search ......... 427/421; 118/326, DIG. 7; 98/115 SB; 55/DIG. 46

[56] References Cited

U.S. PATENT DOCUMENTS

| 3,315,639 | 4/1967 | Close | 118/326 |
| 3,774,522 | 11/1973 | Marsh | 118/326 |
| 4,150,605 | 4/1979 | Telchak et al. | 118/326 X |
| 4,231,289 | 11/1980 | Domicent | 118/326 X |
| 4,315,458 | 2/1982 | Hudson | 118/326 X |

Primary Examiner—Shrive P. Beck

[57] ABSTRACT

A painting booth is formed from three panels for the roof, side walls and back wall of the booth, the bottom or floor of the booth being open, there being hinged doors for closing the front of the booth and providing access thereto. Means are provided for pivotally joining the rear wall of the booth to the back end of a trailer bed. Hydraulic cylinders are mounted on trailer and bed and are employed to pivotally drive the booth between a first position whereat the booth is supported on the trailer bed and a second position whereat the booth surrounds an object to be painted which is located on the ground to the rear of the trailer bed. A blower and filter are provided in a wall of the booth to ventilate the booth.

7 Claims, 5 Drawing Figures

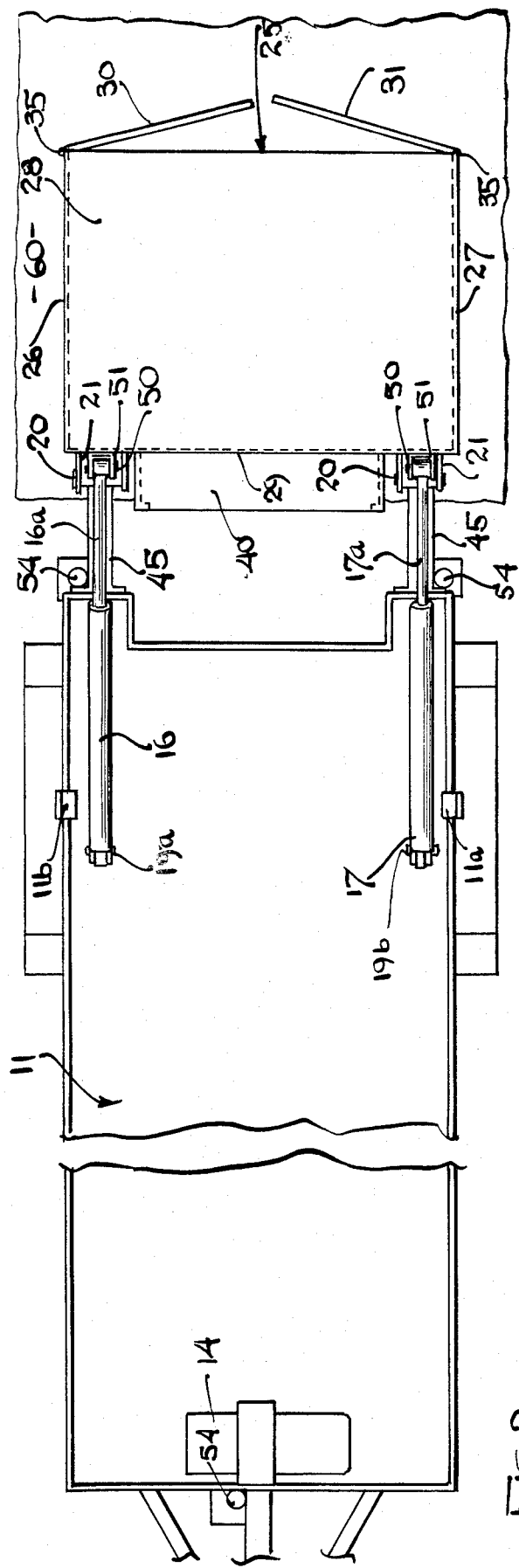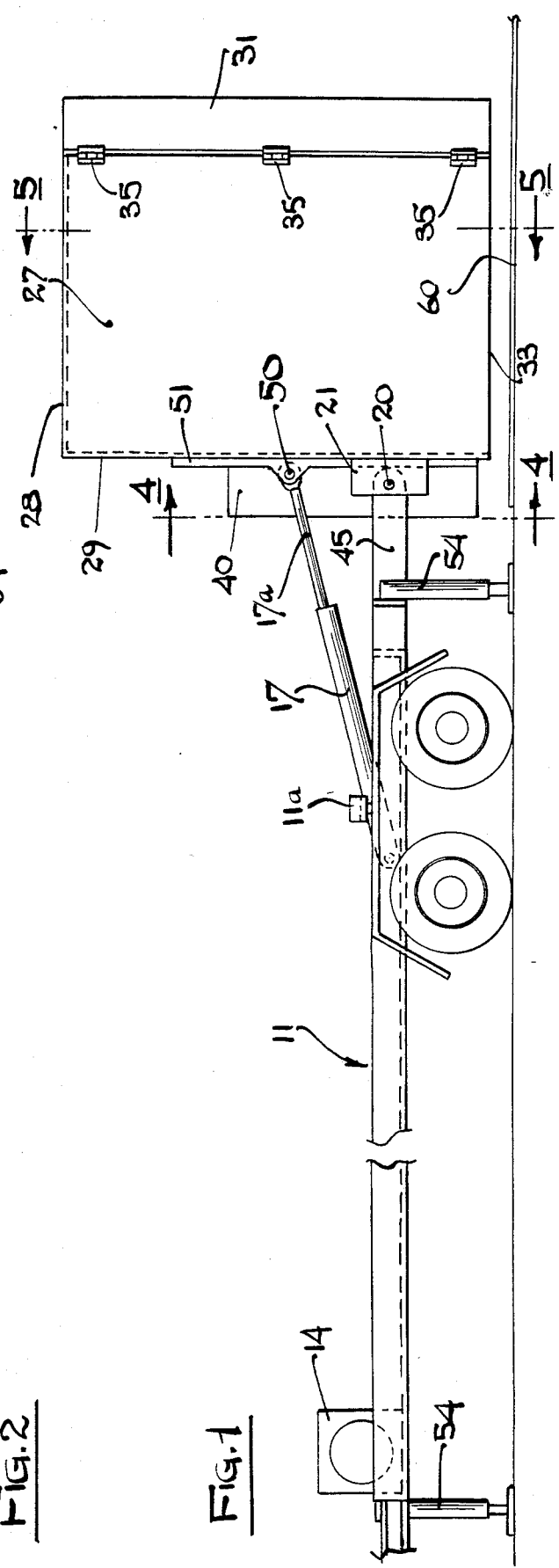

PORTABLE PAINTING ASSEMBLY

This invention relates to painting booths and more particularly to such device which is supported on a trailer bed or the like for transportation and is driven from the trailer bed to a position over an object on the ground to be painted.

There are many situations where moderately large objects need to be painted in situ, either because the objects are permanently or semi-permanently fixed in place or they are too heavy or cumbersome for transportation; for example in the case of large outdoor trash bins used in commercial and apartment house complexes. Either a portable paint booth must be transported to the site and assembled around the object or a tent type covering must be erected. This involves considerable time and expense and often does not provide an optium covering around the object to be painted or may fail to provide proper ventilation in the painting area.

The device of the present invention overcomes the shortcomings of the prior art in providing a portable paint booth which is transported on a trailer bed to the work site and than driven by means of a hydraulic drive mechanism from the trailer bed into position over the object to be painted in relatively short order. When the job has been completed, the device of the invention can be just as easily driven back onto the trailer bed in its position for transportation.

Briefly described the device of the invention comprises a booth formed from four flat panels which provide side walls, a rear wall and a roof for the booth. Hinged doors are provided for the front of the booth to at least partially close this area off during painting and provide access to the booth. The bottom or floor area of the booth is open. A blower and suitable filter are provided in the rear wall of the booth. Means are provided to pivotally connect lower portions of the rear wall of the booth to the back end of a trailer bed, cylinder means being provided to pivotally drive the booth between a first position whereat the booth is resting on the trailer bed and a second position whereat the booth is in position over an object on the ground which is to be painted, in its last mentioned position the booth being a short distance off the ground so that it remains supported on the trailer bed and not on the ground, this is to avoid problems where the ground is not level.

It is therefore an object of this invention to facilitate the painting of objects in situ.

It is a further object of this invention to provide a portable paint booth which can be transported to the site of an object to be painted and rapidly and easily driven into position over such object.

It is still another object of this invention to simplify and economize the provision of a paint booth for objects which are either fixed in position or which cannot be readily transported to another site.

Other objects of this invention will become apparent as the description proceeds in connection with the accompanying drawings of which:

FIG. 1 is a side elevational view showing a preferred embodiment of the invention installed in position for painting an object;

FIG. 2 is a top plan view of the device of FIG. 1;

Figure 3:
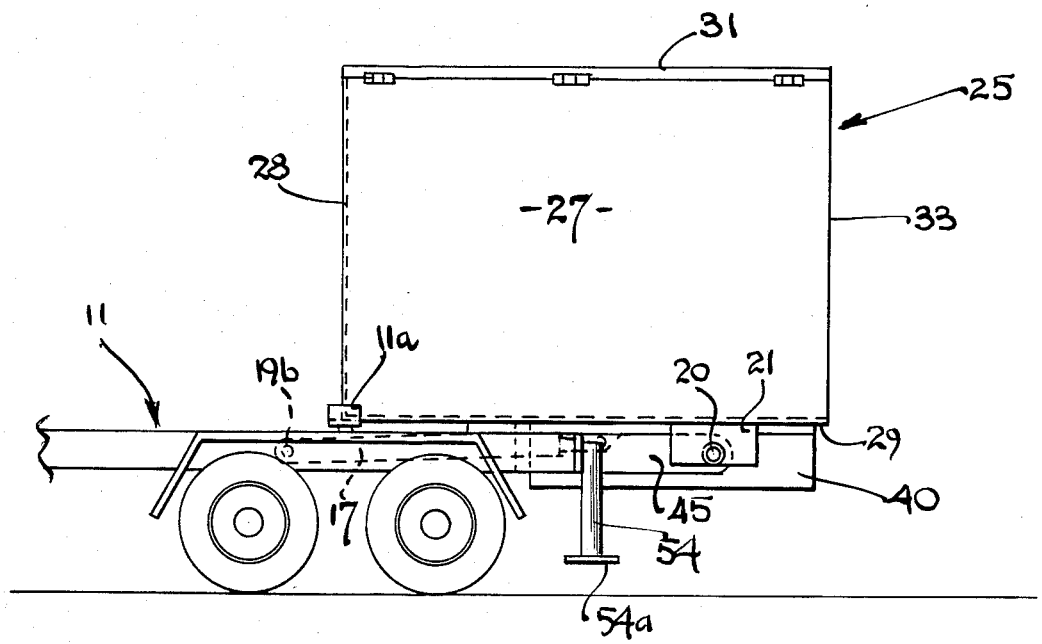
FIG. 3 is a side elevational view illustrating the preferred embodiment in position for transportation on its trailer bed.

Referring now to the drawings, the preferred embodiment of the invention is shown. Paint booth 25 is formed from a pair of opposite side panels 26 and 27, a roof panel 28, a rear panel 29, and pair of front doors 30 and 31, the bottom 33 of the booth being open. Doors 30 and 31 are supported on side walls 26 and 27 respectively by means of hinges 35 and provide a closure for the front of the booth along with means for access to the interior thereof.

Figures 4, 5:
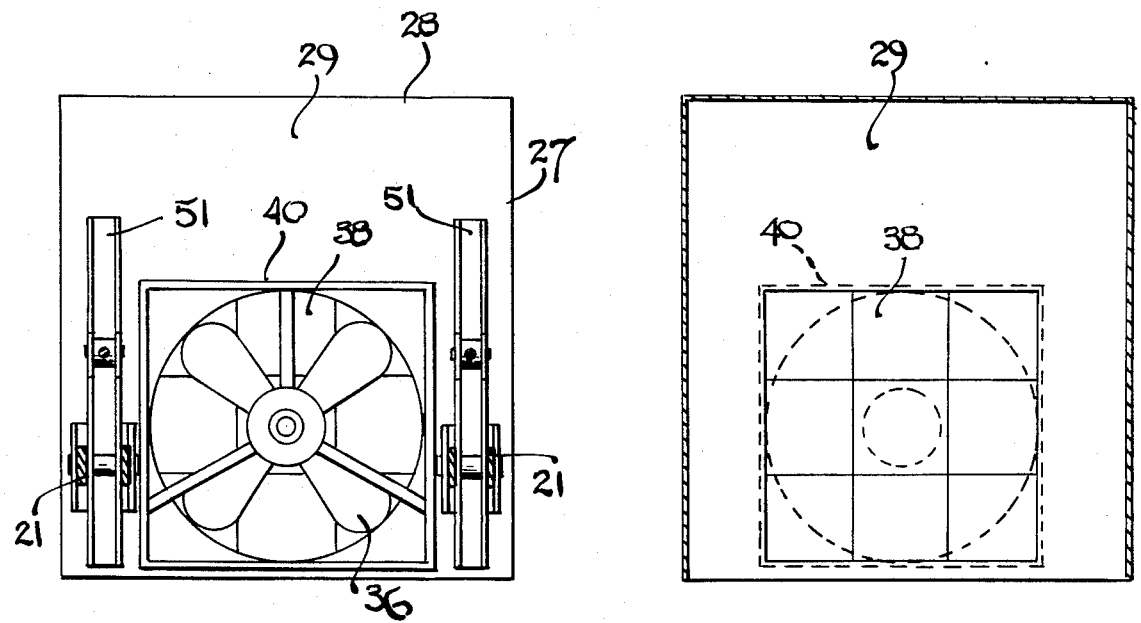
FIG. 4 is a view taken along a plane indicated by 4—4 in FIG. 1.
FIG. 5 is a view taken along a plane indicated by 5—5 in FIG. 1.

As shown in FIGS. 4 and 5, venting to the booth is provided by means of exhaust fan 36, a nine unit filter 38 mounted in frame 40 inwardly of the fan being employed to filter out any particles of paint from the spraying.

The rear wall 29 is pivotally attached to the rear of trailer bed 11 by means of a pair of extension arms 45, one of the ends of which are welded to the rear of the trailer bed and the other ends of which have pivot pins 20 fixedly supported thereon. A pair of brackets 21 are welded to panel 29, these brackets pivotally supporting pivot pins 20.

A pair of hydraulic cylinders 16 and 17 are pivotally supported on trailer bed 11 by means of pivot pins 19a and 19b respectively which are mounted on the bed. The drive rods or rams 16a and 17a respectively of the cylinders are pivotally connected to wall 29 by means of pivot pins 50 which are mounted between rails 51 which are fixedly attached to wall 29. Hydraulic jacks 54 are fixedly attached to the front and rear portions of the trailer bed. A hydraulic drive unit 14 is provided to furnish power for the hydraulic jacks and cylinders.

Referring now to FIG. 3, the booth is shown supported in position for transportation on trailer bed 11. In this position, the cylinders 16 and 17 have their rods fully retracted such that the cylinders rest on the trailer bed. The rear corners of the booth are supported on brackets 11a and 11b which are mounted on the trailer bed. Also, the base portions 54a are fully retracted within the cylinders of jacks 54. To place the booth in position over an object to be painted as shown in FIGS. 1 and 2, hydraulic cylinders 16 and 17 and jacks 54 are actuated by means of hydraulic power unit 14, thereby pivotally driving spray booth 25 from the position shown in FIG. 3 to that shown in FIGS. 1 and 2, the booth being pivotally driven by means of rams 16a and 17a 90 degrees about pivot pins 20. A tarp 60 may be placed in position underneath the booth as is feasible so to do. It is to be noted that the booth in its "painting" position as shown in FIGS. 1 and 2, does not rest on the ground but is spaced a short distance thereabove; this to accomodate for non-level surfaces which condition might otherwise result in damage to the bottom edges of the booth or to the ground surface with the driving of the booth into its final position by the rams. The base portions of the hydraulic jacks 54 are simultaneously driven into position by the power unit to provide steadying support for the bed and booth. After the painting has been completed the booth can rapidly and easily be driven back into position on the trailer bed as indicated in FIG. 3 by actuating the hydraulic power unit to retract the rams 16a and 17a of the cylinders and the bases 54a of the jacks as shown in FIG. 3.

While the invention has been described and illustrated in detail, it is to be clearly understood that this is intended by way of illustration and example only and is not to be taken by way of limitation, the spirit and scope of the invention being limited only by terms of the following claims.

I claim:

1. A portable painting assembly for use in painting an object standing on support means comprising,
   a booth having an open bottom and forming an enclosure on at least three sides;
   mobile means for supporting and transporting said booth and,
   means for driving said booth between a first position supported on said mobile means for transportation and a second position wherein said booth is suspended from said mobile means over the object to be painted but separated from the support means on which said object is standing, said means for driving said booth comprising drive means having drive rods, said drive means being pivotally supported on said mobile means with the drive rods thereof pivotally connected to said booth, and means for pivotally supporting said booth on said mobile means.

2. The device of claim 1 wherein said booth is generally rectangular in form and has a pair of opposite side walls interconnected by a roof wall and a rear wall, there being an opening in said booth opposite said roof wall, and door means for providing a wall for said booth opposite said rear wall and affording access to the interior of the booth.

3. The device of claim 2 wherein said door means comprises a pair of doors pivotally supported on the side walls of said booth.

4. The device of claim 1 wherein said means for driving said booth comprises an hydraulic cylinder.

5. In combination a paint booth for use in providing an enclosure for an object to be painted, said object being supported on support means, said booth being generally rectangular in shape and formed with a pair of opposite side walls, a rear wall and roof wall joining said side walls together and door means for forming a wall opposite said rear wall and providing access to the interior of said booth,
   a trailer bed,
   means for supporting the trailer bed on the ground,
   a pair of hydraulic cylinders pivotally mounted on said trailer bed, said cylinders having drive rods, the ends of which are pivotally attached to the rear wall of said booth,
   means for pivotally attaching the rear wall of said booth to said trailer bed,
   jack means attached to the trailer bed, and
   hydraulic means for actuating the cylinders and jacks means to drive said cylinders and jack means between a first retracted position whereat the booth is supported on said trailer bed and a second extended position whereat the booth is over the object to be painted separated from and above the support means on which the object is standing, with the jack means abutting against the ground to steady the bed and the booth.

6. The device of claim 5 wherein said jack means comprises a pair of jacks on opposite sides of the rear of the trailer bed.

7. The device of claim 5 wherein the means for pivotally attaching the rear wall of the booth to the trailer bed comprises a pair of extension arms attached to the rear of the trailer bed and extending rearwardly therefrom, a pair of brackets fixedly attached to the rear wall of the booth and means for pivotally connecting each of said extension arms to a respective one of said extension arms to a respective one of said brackets.

* * * * *